US012118902B2

(12) United States Patent
Rössl

(10) Patent No.: US 12,118,902 B2
(45) **Date of Patent: *Oct. 15, 2024**

(54) BATTERY-OPERATED ELECTRONIC LABEL

(71) Applicant: VusionGroup GmbH, Fernitz-Mellach (AT)

(72) Inventor: Andreas Rössl, Graz (AT)

(73) Assignee: VusionGroup GmbH, Fernitz-Mellach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,589

(22) Filed: Sep. 1, 2023

(65) Prior Publication Data

US 2023/0410693 A1 Dec. 21, 2023

Related U.S. Application Data

(63) Continuation of application No. 17/777,688, filed as application No. PCT/EP2019/082223 on Nov. 22, 2019, now Pat. No. 11,776,433.

(51) Int. Cl.

| | |
|---|---|
| ***G09F 3/14*** | (2006.01) |
| ***G09F 3/20*** | (2006.01) |
| ***G09F 9/37*** | (2006.01) |
| *G09F 13/22* | (2006.01) |

(52) U.S. Cl.

CPC ................ *G09F 3/14* (2013.01); *G09F 3/208* (2013.01); *G09F 9/372* (2013.01); *G09F 2013/222* (2013.01)

(58) Field of Classification Search

CPC . G09F 3/14; G09F 3/208; G09F 9/372; G09F 2013/222

See application file for complete search history.

(56) References Cited

U.S. PATENT DOCUMENTS

| | | | | |
|---|---|---|---|---|
| 9,845,935 | B1 * | 12/2017 | Cheng | G09F 23/00 |
| 10,789,861 | B1 * | 9/2020 | Boddie | G09F 3/207 |
| 2009/0133301 | A1 | 5/2009 | Saxena et al. | |
| 2009/0277052 | A1 * | 11/2009 | Chang | G09F 3/14 24/129 R |
| 2015/0206461 | A1 * | 7/2015 | Jubro | H01M 50/507 429/96 |
| 2017/0193865 | A1 * | 7/2017 | Harel | G09F 13/22 |
| 2018/0040263 | A1 * | 2/2018 | Freeman | A45C 13/42 |
| 2019/0354824 | A1 * | 11/2019 | Mohiuddin | G06Q 20/201 |
| 2020/0224841 | A1 * | 7/2020 | van Olst | F21V 23/002 |

(Continued)

FOREIGN PATENT DOCUMENTS

EP 2924678 A1 9/2015

OTHER PUBLICATIONS

Notices of Reference Cited in parent application 1777768; USPTO.

*Primary Examiner* — Gary C Hoge

(74) *Attorney, Agent, or Firm* — Studebaker & Brackett PC

(57) ABSTRACT

An electronic label with a housing, that comprises a front wall and a rear wall and a side wall, wherein the front wall comprises a, particularly reflective, screen, and wherein by contrast to the front wall and rear wall, the side wall is constructed to be light-conducting and wherein a light source for emitting the light that can be generated using it through the side wall is positioned inside the housing, and wherein the side wall is inclined towards the front wall.

19 Claims, 7 Drawing Sheets

(56) References Cited

U.S. PATENT DOCUMENTS

| | | | | |
|---|---|---|---|---|
| 2021/0049884 | A1* | 2/2021 | Siao | G09F 3/037 |
| 2021/0280092 | A1* | 9/2021 | Sundholm | G08B 13/2434 |
| 2021/0310283 | A1* | 10/2021 | Xu | E05B 73/0017 |
| 2022/0036768 | A1* | 2/2022 | Cho | G09F 9/30 |
| 2022/0309261 | A1* | 9/2022 | Sundholm | G06K 19/07707 |

* cited by examiner

BATTERY-OPERATED ELECTRONIC LABEL

CROSS-REFERENCE TO RELATED APPLICATIONS

This is a continuation of U.S. patent application Ser. No. 17/777,688 filed on May 18, 2022 and presently pending and allowed, which is a 35 U.S.C. 371 National Stage Patent Application of International Application No. PCT/EP2019/082223, filed Nov. 22, 2019; all of which are hereby incorporated by reference in their entireties as if set forth in full herein.

DESCRIPTION

Technical Field

The invention relates to a battery-operated electronic label.

Background

In the case of a known label of the generic type mentioned at the beginning, the display unit (screen) is realized by means of electronic ink or electronic paper technology, that is to say with the aid of “electronic paper”, abbreviated to “e-paper” or “e-ink”. The reflective screen used for this is known in technical jargon as an electronic paper display, shortened to EPD. These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black particles are placed in front of the white particles or vice versa in the viewing direction. This arrangement is then maintained for a relatively long time (e.g. a few weeks) without further energy supply. These EPDs are usually designed for black and white display or for greyscale display, and since then also for black, white and red display or else for black, white and yellow display. Labels which are equipped with such EPDs displayed static information, similarly to a classical, non-electronic label. Here, the EPD is provided for displaying the same information in as energy-saving a manner as possible over a relatively long time.

In order to change the image, the image change process mentioned at the beginning must be run through anew. That aside, the updating of the image is relatively energy-intensive compared to the static display of the image. Furthermore, the particles need time to rearrange, so that the updating of the image takes place more slowly than for other screen technologies, so that the change of the image content is sometimes visible for the observer. A relatively frequent updating, for EPD technology, of the display in a short time would therefore lead to a considerably higher energy consumption and to a sluggish seeming image sequence with undesirable attention on this shortcoming.

The technology of the screen used here consequently does not offer any possibility to stimulate a desired attention for the observer due to dynamic image change. Therefore, in the case of the labels, aside from the display of different, static images with similar colour variation, there is no possibility to draw attention to individual products or offers in a visually dynamic way and therefore make these stand out from other products in an optically noticeable manner.

The object of the invention is to provide an improved electronic label in which the aforementioned problems are overcome.

SUMMARY OF THE INVENTION

This object is achieved by an electronic label with a housing, which comprises a front wall and a rear wall and at least one side wall, wherein the front wall comprises a, particularly reflective, screen, and wherein by contrast to the front wall and rear wall, the side wall is constructed to be light-conducting and wherein a light source for emitting the light that can be generated using it through the side wall is positioned inside the housing, and wherein the side wall is inclined towards the front wall.

The object is furthermore achieved by a system which comprises an electronic label according to the invention and an anti-theft device and a tie, which connects the electronic label to the anti-theft device.

Using the measures according to the invention is associated with the advantage that due to the light output via the side wall dynamically, it is possible to draw attention dynamically to individual products or product groups, or even separately from the products or product groups, only to the electronic label as such. Whilst the screen is statically presenting information in the form of text and images and requires little to no electrical energy in the process, electronics of the label control whether and how (in the form of e.g. frequency, colour, intensity, etc.), that is to say the dynamic with which light is output through the side wall, in order to therefore divert the attention of potential customers or even personnel to the respective product, the product group or the label.

As mentioned, the label can also be used to draw the attention of personnel to it. Therefore, e.g. prior to the opening of a food shop, those labels which relate to a product nearing its expiry date can emit a warning light signal with a certain frequency or certain colour for customers, and those labels which relate to a product already past its expiry date can emit an alarm light signal with a different frequency or colour, so that the personnel becomes aware of that according to the light signal coding and can take the appropriate measures. The control data required for this can either be stored in a storage module of the electronics of the label and/or be obtained from a data processing system via a communication module of the label.

The side wall, the orientation of which is orientated at least to some extent (as may be the case for example for a curved side wall surface), preferably for the most part, and in particular completely (as would be the case for example in the case of a flat side wall surface), forwards in the direction of the front wall, ensures that the light generated inside the housing is conducted or radiated in such a manner that it can be seen well from as many observation directions onto the label as possible. In particular, a slight incline of the side wall, e.g. by 3°-15°, towards the front wall ensures that the light signal can be perceived well as observed from the front (that is to say with a viewing direction onto the screen). Even if the light signal is generated initially in a substantially punctiform manner in the interior of the housing, the light-conducting or light-permeable design of the side wall and the feeding in of the light in the interior of the housing ensures that the light signal is radiated extensively, indeed in fact illuminates the entire side wall. As a result, less intensive light is required in order to divert attention onto the electronic label, its information and the product or the product group. This leads to a lower energy requirement in spite of light signals that are dynamic and radiated over a wide area.

The side wall may be realized e.g. by a transparent plastic part which is produced with the aid of an injection moulding method. The side wall may however also be realized in glass or plexiglass and the like. Also, the side wall may be constructed similarly to a conventional optical waveguide, wherein light entry is favoured at its side orientated into the interior of the housing and light exit is favoured at its side orientated outwards out of the housing and in between a lateral exit of the light is stopped or prevented by the corresponding course of the refractive index.

The side wall can be shaped such at its peripheral end that it ends in a de facto edgeless manner only in a tapering edge. However, if the side wall has an edge with a thickness, then it has a side wall edge. This side wall edge may be configured to be opaque. However, it may also be advantageous that even the side wall edge is transparent, so that the light can exit not only via the side wall surface that dominates the area, but also through the side wall edge that is relatively narrow compared to the side wall surface. This may be preferable if the side wall is not embedded between adjacent walls, but rather is placed onto these adjacent walls, so that the side wall edge is visible. Thus, the viewing area for the observer may be enlarged, because they can also perceive the illuminating side wall edge.

The side wall or its material is preferably laid out in such a manner that the side wall conducts the light from inside outwards as well as possible. By means of an optional optimization of the shape and material, it is possible for the maximum possible luminosity (light intensity) of the light to be present upon emergence from the side wall.

The side wall may for example run all around peripherally between the front wall and the rear wall, so that the light signals can also be perceived as viewed from every side of the label.

Preferably, however, in an e.g. substantially square construction of the label, only one of the side surfaces is constructed as the side wall in a transparent or light-conducting manner.

According to an even more preferred embodiment, it is possible in this context to dispense altogether with separate different side wall elements. In this case, aside from the one light-conducting side wall or side surface, the rest of the housing is formed completely by the front wall and the rear wall, which are constructed in a bowl-shaped manner, while exposing the side wall and an opening for the screen on the front wall and for the most part enclose the interior of the label between them peripherally.

In order to obtain light exit only at the side wall, it is advantageous if the front wall and the rear wall are opaque. This is achieved e.g. by means of the choice of a suitable plastic granulate, if appropriate due to its colour, from which all other walls or wall sections, such as the front wall and the rear wall, are manufactured.

Of course, any desired active screen, such as for example an OLED or LCD screen may be used as screen. However, in a battery-driven label as described at the beginning, an extremely energy-saving reflective EPD screen is used.

Further particularly advantageous embodiments and developments of the invention result from the dependent claims and also the following description.

As mentioned, the label may comprise a communication module for wireless communication, with the aid of which data and/or commands can be exchanged with an access point. Therefore, the label can be controlled from a central server or a data processing system.

For the purpose of communication with the access point, a wide range of communication protocols can be used, such as for example Bluetooth, ZigBee, WLAN, etc. However, a proprietary time slot communication method is preferably used, which is described in WO 2015/124197 A1, pages 2-22, and the disclosure thereof is hereby incorporated by reference. According to a further aspect of the invention, the side wall comprises an energy storage device holder protruding into the interior of the housing, which is designed to hold at least one electrical energy storage device, particularly a battery or a rechargeable battery, particularly preferably a button cell battery, at an intended position in the housing. At this intended position, the poles of the energy storage device are contacted with electrically conductive (usually metallic) contact elements, wherein the contact elements for their part are electrically conductively connected to the electronics, in order to supply the electronics of the label with electrical energy. The side wall and the energy storage device holder can be realized separately from one another and connected to one another by adhesive bonding or screw connection.

Preferably, the side wall and the energy storage device holder are constructed in one piece. Thus, both, that is to say the side wall and the energy storage device holder, which in the following are together termed a combination part, are produced from one and the same material and designed to be light-transmissive or transparent or, in other words, light-conducting. This is associated with the advantage that the feeding-in of the light does not necessarily have to take place at the side wall directly, which may occasionally be associated with a positioning of the light source and the connection thereof to the electronics which is problematic and difficult to realize, but rather can take place in a position located deeper in the housing, in the region of the energy storage device holder. The light propagating from there in the combination part allows a more homogeneous illumination of the side wall than would be the case if the feeding-in of the light were to take place directly at the side wall or in the immediate vicinity. The reason for this is that the light source is located further away from the side wall and the light emanating from its substantially punctiform formation zone at the light source can already propagate spatially towards the side wall on the path through the combination part, so that upon reaching the side wall, the light illuminates the same as homogeneously as possible and therefore, when viewed from outside, the side wall is perceived as illuminating with uniform brightness. If the light were namely to be fed directly into the side wall at a certain point on the side wall, the side wall at this feed-in point would be illuminated extremely brightly and other regions located further from the site of the feeding-in would be less brightly illuminated.

Particularly preferably, the energy storage device holder is free from separate clamps or springs or electrical contacts and the like, so that the energy storage device can be inserted into or removed from the energy storage device holder in a manner free from hindrance, particularly without non-positive fit or clamping. This means that with the aid of the energy storage device holder, only positioning of the energy storage device at the position provided therefor in the housing takes place, that is to say along the insertion or removal direction. Positioned there, the energy storage device is contacted directly essentially by the contact elements provided inside the housing and fixed by the same non-positively transversely to the insertion or removal direction. In this case, the contact elements are constructed or positioned in such a manner that the energy storage device, without further auxiliary means, can be inserted into the housing only by means of the energy storage device holder along the insertion direction and removed from the housing along the removal direction, which runs in the opposite direction.

Adapted to the shape of the energy storage device, the energy storage device holder can be constructed differently. If for example, a button cell battery (button cell for short) is used, it is advantageous if the energy storage device holder is constructed in a bowl- or pan-shaped manner. Thus, the button cell can readily be inserted into the bowl or pan, which is adapted to its size and shape, and, held in such a manner, inserted into the housing. Here, it may also be advantageous if the bowl or pan is designed to be free of material in its central region, that is to say only essentially consists of a ring which underlaps or encloses the button cell slightly and only in some regions. This leads, in the case of high numbers of pieces in particular, to a significant material saving and thus to a less expensive design. The bowl or pan may also be constructed in two pieces, particularly with the formation of the split at the central region most remote from the side wall, that is to say comprise a left and a right part, wherein these two parts unite towards the side wall and button cell is accommodated between these two parts. In this case, the two parts may be dimensioned in such a manner or the spacing from one another may be set in such a manner that the button cell is at least slightly clamped between them. The removal can therefore take place in a tool-free manner.

The bowl- or pan-shaped design also facilitates the removal of the button cell, as the bowl or the pan only has to be rotated, so that the button cell falls out of it or, in the case of light non-positive fit between the bowl or pan and the button cell, can be pressed out of it by means of light finger pressure (e.g. through the material-free central region onto the button cell).

Here, it has proven particularly advantageous if the combination part consisting of side wall with its energy storage device holder is designed to be drawer-like. Thus, the combination part can be gripped very easily in the region of or directly on the side wall and can be operated similarly to a drawer, into which the energy storage device is placed. This allows a convenient and fast assembly (insertion of the battery) during initial installation, but also during maintenance, such as e.g. in the case of battery replacement.

In order to enable this simple handling, the housing also comprises a shaft running between the front wall and the rear wall for accommodating the energy storage device holder. The shaft can be designed for the positive and/or non-positive mounting of the energy storage device holder. The combination part can be pushed into this shaft in accordance with the handling described, in the manner of a drawer, in order to position the energy storage device in the housing at its intended position and to electrically supply the label there, or pulled out in the manner of a drawer, in order to replace or to remove the energy storage device and in order e.g. to end the operation of the label. In order to provide the positive fit and/or non-positive fit described, the shapes and dimensions of the shaft and combination part are accordingly adapted to one another.

According to a further aspect, the rear wall comprises a protrusion, which surrounds an energy storage device accommodating region, which is dimensioned in such a manner that the energy storage device holder together with the energy storage device can be accommodated. This protrusion is lifted from the remainder of the rear wall and is open towards the side wall. The protrusion can be dimensioned in accordance with the space requirement in the interior of the label. It forms the enclosure, so to speak, of the shaft on the rear wall. This special shaping of the rear wall allows a material-saving design, because in other regions of the housing, where only the relatively flat electronics or the screen are to be accommodated in the housing, a significantly thinner or flatter design of the housing is possible, which leads to a reduced lateral use of material there compared to the protrusion.

Furthermore, it is advantageous if the rear wall comprises a recess adjacent to the side wall and a part of the energy storage device holder is exposed there. This is associated with the advantageous effect that an extensive contacting of the part of the energy storage device holder with the fingertip of a human hand is possible there. Particularly when pulling the energy storage device holder out of the housing, a substantially more efficient transmission of force can therefore be ensured than would be the case if one had to grip an edge of the side wall that is typically only relatively thin.

The separation of the combination part from the housing can therefore be accomplished particularly easily because in the recess, a part of the energy storage device holder actually forms a part of the outer surface of the housing. Thus, e.g. the label can be held in one hand, wherein the fingers of the hand surround the housing substantially parallel to the planar extent of the side wall, and at the same time, a pressure can be applied using the thumb normal to the outer surface formed by the combination part and in the direction of the side wall, so that the combination part can be pressed out of the housing. Only the recess in the rear wall allows this one-handed pressing out of the combination part from the housing.

However, the part of the energy storage device holder exposed in the recess also illuminates extensively just like the side wall, only rather on the rear wall with a different area shape, namely more square or rectangular and not thin or elongated, as is the case for the side wall, which is relatively narrow compared to the front or rear wall. This difference can be perceived by personnel without great effort devoted to attention, in order e.g. to identify labels which are placed on goods the wrong way round, that is to say with the screen and consequently also with the front-facing side wall orientated towards the goods.

If the label is orientated correctly however, that is to say with the screen orientated away from the product, the light emitted by its rear side can contribute to illuminating the product in the direct surroundings of the label, which (particularly in the case of correspondingly dimmed ambient light) leads to a virtually magical lighting effect on the product itself. This is possible because, along the rear wall, between the protrusion and the side wall, there is always a space present between the product and the label, where the light exiting from the exposed part of the energy storage device holder at the rear side of the label can also propagate laterally.

The protrusion of the rear wall enclosing the energy storage device accommodating region is constructed adjacently to the recess. The protrusion is therefore positioned at a distance from the side wall. This distance may have a value between a few millimetres up to approx. two, even 3 cm. The length of the part of the energy storage device holder, which is available for interacting with the fingertip of the human hand and also for emitting light at the rear wall of the label, is defined by means of the dimensioning of the distance. The width of this part of the energy storage device holder (which is available for interacting with the fingertip of the human hand and also for emitting light at the rear wall of the label)

may otherwise be orientated by the dimensions of the energy storage device. In the case of a button cell, this would be the diameter of the button cell, wherein the said width exceeds this button cell diameter by approx. 1 to 5 mm, in order to ensure a satisfactory stability of the energy storage device holder.

The said protrusion of the rear wall is used as explained with respect to its interior for accommodating the energy storage device holder together with the energy storage device. In addition, the protrusion may comprise a tie guide for guiding a tie, which can be inserted into the tie guide, along the outer contour of the protrusion. The protrusion may therefore have a double use. The tie guide is used to guide a tie, using which the label is fastened to a different object, for example an anti-theft device. With the aid of the tie, the label can however also be fastened without an anti-theft device to a different object, as a shelf edge strip. In both use cases, the label can be positioned on the tie in a dangling manner. The label together with the tie forms a first system, which is used purely for fastening the label. The label together with the tie fastened to an anti-theft device forms a second system, namely an anti-theft system.

The use of the tie for fastening the label to products has proven particularly advantageous in particular, when the products should not be presented on conventional shelves, at the front of which a single label is fastened, which displays information for a multiplicity of identical products. Namely, with the aid of the tie, the label can be fastened to individual products, such that it can be seen well, which products are for example presented in a hanging manner or so as to be individually set out or placed. This is the case for example for items of clothing, handbags, sports equipment or even watches, etc.

Particularly preferably, the tie guide leaves the shaft open, particularly in the direction from it towards the side wall, and comprises tubes on both sides of the shaft. Thus, it is ensured that the shaft is not covered by the tie and the combination part consisting of side wall and energy storage device holder can be pushed into the shaft and removed from the shaft unhindered. Also, the spacing between the tubes ensures that the left and right tie sections running above the label turn out by themselves due to the rope forces that arise during dangling, and the label assumes the orientation which corresponds to the parallel running of these tie sections towards a tie fastening to a different product or an anti-theft device.

Furthermore, it may be provided that the tie guide runs between the two tubes, which preferably run at the outer edges of the rear wall, in an arcuate, preferably part-circular, particularly preferably semi-circular manner, and/or in a manner such that it is constructed to be open towards the outside. The tie guide can therefore be completely closed along the protrusion, which ensures that the tie runs on the rear wall in a substantially hidden manner. On the other hand, the tie guide may also be open towards the outside, which entails a contribution to the aspect of material saving with respect to the rear wall.

Therefore, a tie can be guided through the tie guide, using which tie the electronic label can be fastened to products. In order to prevent damage to products as a consequence of a heavy load and for aesthetic reasons, compact electronic labels are envisaged. This is achieved if the combination part is used to hold the battery or the rechargeable battery in position at the end of the label at which the tie guide guides the tie in and out. In order to guide the tie with as little resistance as possible, the tie should not be guided round edges that are too sharp. Therefore, a minimum radius is necessary, in order to reduce the friction during tie guiding. By contrast, however, an excessively large radius would increase the friction again. Due to the arrangement mentioned, it is possible to guide the tie, using the tie guide, around the shaft in the housing of the electronic label, which contains the battery or the rechargeable battery and the combination part, without the tie being hindered at tight edges or an excessively large radius being present. The electronic label must therefore be designed to be no larger at the location of the tie guide than a different electronic label without a tie guide.

It has furthermore proven particularly advantageous if the centre of gravity of the electronic label is located below the midpoint of the tie guide. This allows the dangling label to align itself vertically under the action of gravity and, as explained, allows the tie sections above the label to turn out independently, if this is necessary.

For a label that is to be positioned such that it lies on a product, it is desirable that the electronic label can be aligned in such a manner that it can be read well by the customer. In the case of conventional labels, this often contradicts the requirement that the conventional label should be fastened to the product as securely as possible, so as not to be able to fall off the product. In practice, however, this leads to limitations for the orientation of the product on the shelving unit, as it should always be possible to read the label well and therefore its orientation should also be adapted to the orientation of the image content. However, both aspects are taken into consideration with the label according to the invention. On the one hand, the label is securely connected by the tie to a product or an anti-theft device coupled to the product. On the other hand, the label is only loosely connected (freely movable with respect to the tie, but within the limits predetermined by the tie length) to the tie by the tie guide and it therefore remains possible in its position lying on a product to change or adjust its angle (its orientation). This means that the product can be placed on the shelving unit in practically any desired orientation, but at the same time, the orientation of the label placed thereon remains optional.

The tie can be realized by means of a monofibre or by a fibre composite (e.g. twisted fibres). It can be realized as a plastic tie, carbon fibre tie, natural fibre tie, metal tie, etc. or else in a combination of a wide range of materials. The diameter thereof can be adapted to the tie guide in the range of approx. 1-6 mm.

The anti-theft device mentioned, to which the label can be connected by the tie, could e.g. be realized by means of a conventional mechanical security tag.

In order to provide the various functionalities of the label, the label comprises the aforementioned battery-operable electronics, which are designed to actuate the screen and the light source. The actuation of the light source can for example take place by means of a constant current or else a current that is modelled with regards to duration and/or amplitude. Accordingly, the electronics comprise a corresponding driver stage, which can typically be realized with the aid of one or more transistors. This driver stage can be designed to be discrete or digital, that is to say integrated. The electronics can furthermore be realized with the aid of an application specific integrated circuit (ASIC), a microcontroller or a microprocessor, with corresponding peripheral components. Thus, programs can be executed, which for example implement the communication protocol for the communication module, which control or handle the communication with the access point, and/or send commands and/or data to the screen or retrieve and process status information from the screen. Moreover, it is also mentioned at this point that in addition to the physical display medium, the screen can also have its own digital screen controller, which correspondingly processes the received data and/or commands, so that the corresponding image contents become visible on the physical display medium. All of these electronic components are provided with electrical energy with the aid of the energy storage device.

A single LED or else an OLED, etc. can be used as light source. According to a preferred embodiment, which is namely also extremely energy-saving and in spite of that ensures a homogeneous illumination of the side wall, the electronic label comprises at least two LEDs positioned at different places as light source. With the aid thereof, light can be fed from various sides (for example from the left and the right side) into the energy storage device holder in the interior of the housing. This may of course also take place using a higher number of LEDs, which are positioned along the energy storage device holder. According to this measure, the uniform and homogeneous illumination of the side wall is not only based on the aspect that the light from the light source can propagate towards the side wall given an appropriate distance therefrom, but rather also that a multiplicity of light sources additionally has a positive effect on the uniform and homogeneous illumination of the side wall.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
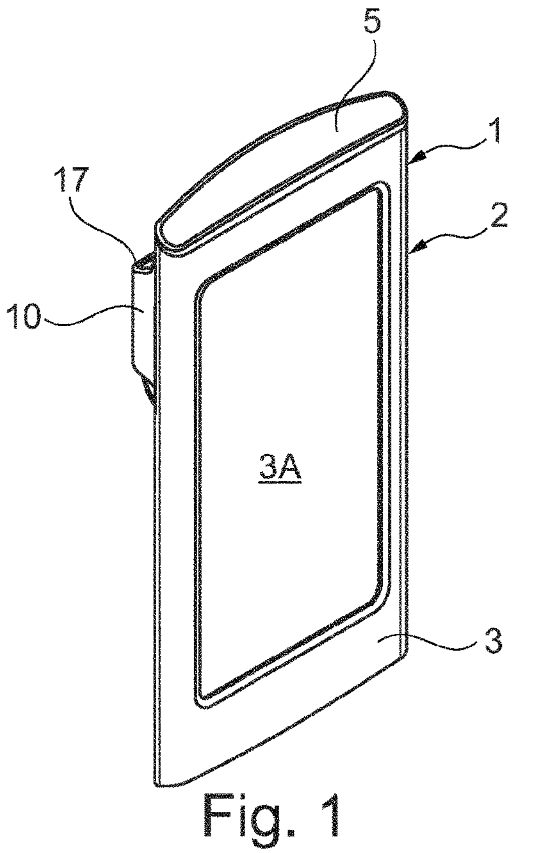
FIGS. 1-2 schematically show an electronic label according to the invention in two oblique front views.
Figure 2:
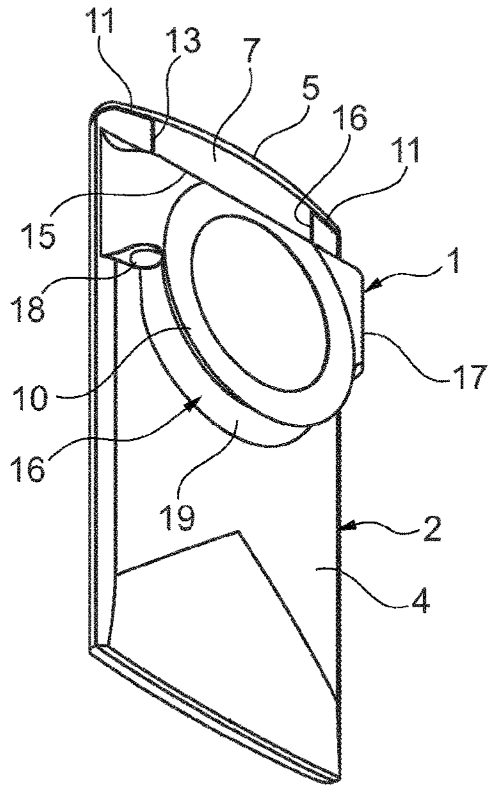
Figure 3:
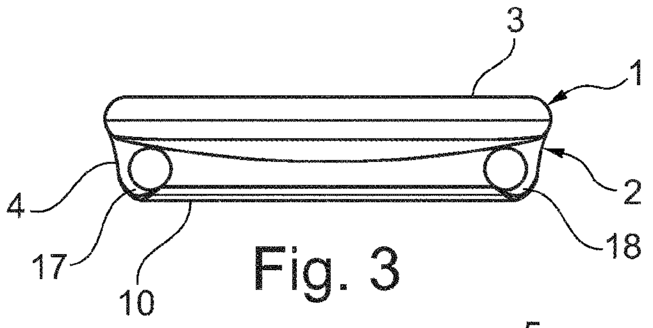
FIG. 3 schematically shows the label viewed from below.
Figure 4:
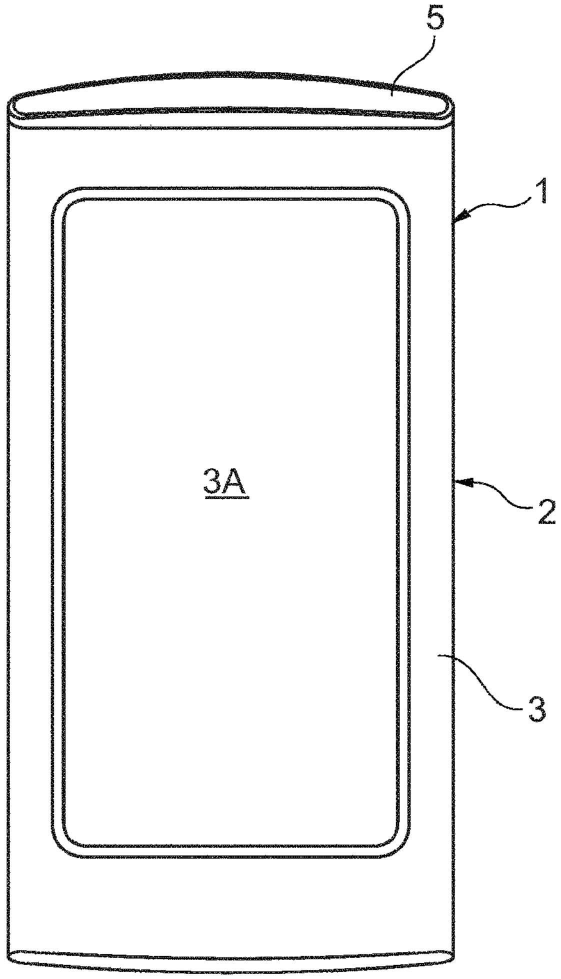
FIG. 4 schematically shows a view of the label with a viewing direction onto its front wall.
Figure 5:
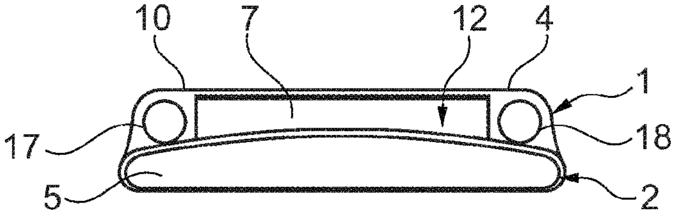
FIG. 5 schematically shows the label from above with a viewing direction onto the side wall.
Figure 8:
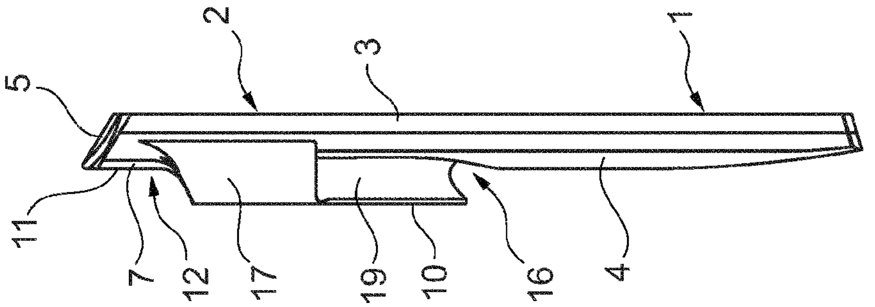
FIG. 8 schematically shows a further side view of the label as viewed from the other side.
Figure 7:
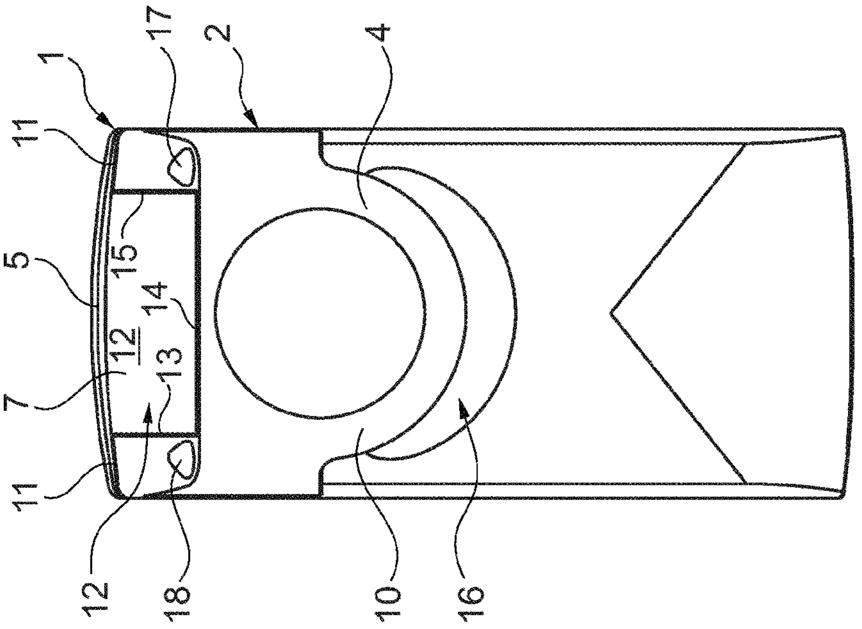
FIG. 7 schematically shows a view of the label with a viewing direction onto its rear wall.
Figure 6:
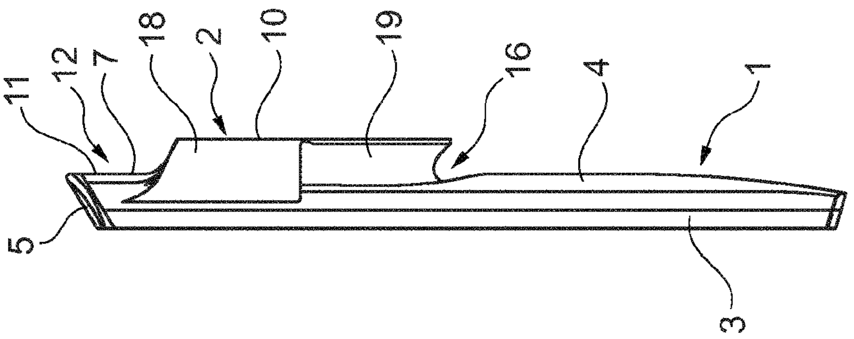
FIG. 6 schematically shows a side view of the label as viewed from one side.

An electronic label 1 according to the invention, termed a label 1 for short in the following, is illustrated in different views in FIGS. 1-10. The label 1 comprises a housing 2, which is formed from a front wall 3, a rear wall 4 and a side wall 5.

A constituent of the front wall 3 is also a reflective screen 3A, which is inserted into a recess of the material of the front wall 3 adapted to the dimensions thereof.

The three walls 3-5 are manufactured from plastic (e.g. in an injection moulding method), wherein the front wall 3 and the rear wall 4 are produced from an opaque or non-transparent (if appropriate also coloured) plastic. By contrast, the side wall 5 is manufactured from a transparent plastic, that is to say a light-conducting plastic. Furthermore, the front wall 3 and the rear wall 4 except for the upper end thereof are constructed in a bowl-shaped manner, so that they realize a large part of the housing 2 as half shells that are joined together.

The side wall 5, which closes or delimits the two housing shells of the housing 2, which are joined together and consist of the front wall 3 and the rear wall 4, at the top, is a constituent of a combination part 6 visualized in FIGS. 11 to 15 from various perspectives. Next to the side wall 5, this combination part 6 comprises an energy storage device holder 7, which adjoins the same in an angled manner, which is realized as a button-cell battery holder, into which a button cell battery 8 can be inserted (see FIGS. 9 and 10). Just like the side wall 5, the energy storage device holder 7 is realized from the said light-conducting plastic and constructed in one piece with the side wall 5, that is to say produced in one and the same production step. The combination part 6 is essentially constructed in a drawer-like manner, in order to place the button cell battery 8 inside the housing 2.

Figure 9:
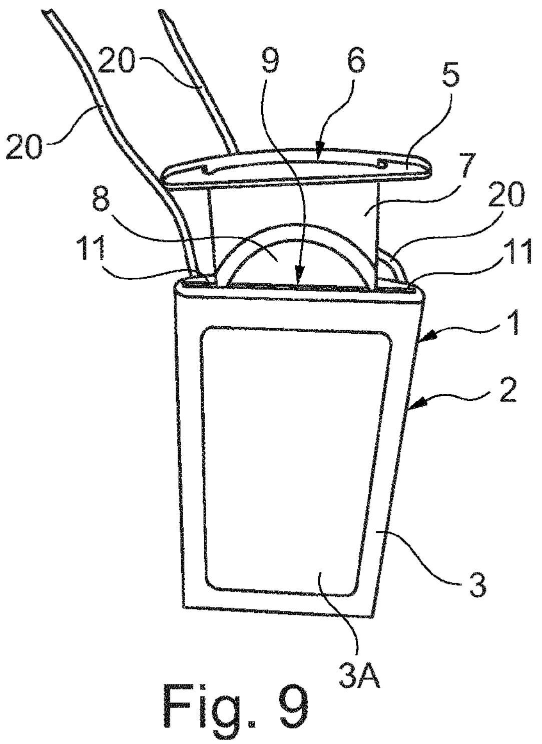
FIG. 9 schematically shows the label with a viewing direction onto the front wall with a partially pulled out combination part consisting of the side wall and an energy storage device holder.

The two housing shells 3 and 4 of the housing 2 close the housing 2 to the left and to the right side and at the bottom, that is to say at its underside and leave an entrance into a shaft 9, which is visible in FIG. 9, open at the top. The combination part 6 can be inserted into or pulled out of this shaft 9 in a drawer-like manner. By inserting the combination part 6, the button cell battery 8 can be placed in the housing 2 at its intended position, where it is used for electrically supplying the entire electronics (not illustrated in detail, see reference number 25 in FIG. 17, however) of the label 1. By pulling out the combination part 6, the button cell battery 8 can be removed from the housing 2 and, if appropriate, replaced. In this context, reference is made to FIGS. 9 and 10, which show the housing 2 with the partially pulled-out combination part 6, into which a button cell battery 8 is inserted, with a viewing direction onto the front wall 3 and with a viewing direction onto the rear wall 4.

Furthermore, it is highlighted that the side wall 5 is inclined towards the front wall 3 at an angle of approx. 10°. This can for example be seen well for example in FIGS. 1, 4, 6 and 8. Also, this can be drawn analogously from FIGS. 12, 13, 14 and 15, where the combination part 6 is illustrated detached from the housing 2 and the inclined orientation of the side wall 5 can be seen in relation to the energy storage device holder 7. In order to obtain a flush closure of the two housing shells 3 and 4 with the underside of the side wall 5 at the top, the course of the upper edge of the front wall 3 and the rear wall 4 is correspondingly adapted to the incline of the side wall 5.

With reference to the FIGS. 1, 2, 3, 5 and 6-8 and 10 and also 16, it is established that the rear wall 4 furthermore comprises a protrusion 10, which encloses an energy storage device accommodating region in the interior of the housing 2 from the rear side, that is to say the rear wall side. This protrusion 10 forms the rear delimitation of the previously mentioned shaft 9. In addition, the rear wall 4 shows a recess

12 extending from its upper rear wall edge 11 to the protrusion 10, which is delimited by the further rear wall edges 13, 14 and 15. A part of the energy storage device holder 7 is exposed in this recess 12, so that finger pressure can be exerted there using the tip of a finger of the human hand (not illustrated), in order to be able to insert the energy storage device holder 7 into the shaft 9 more easily, but particularly to be able to pull out or press out the energy storage device holder more easily.

Figure 10:
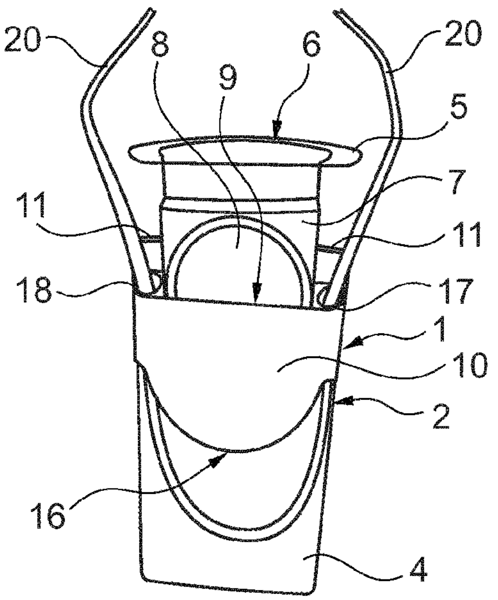
FIG. 10 schematically shows the label according to FIG. 9 with a viewing direction onto the rear wall.
Figure 11:
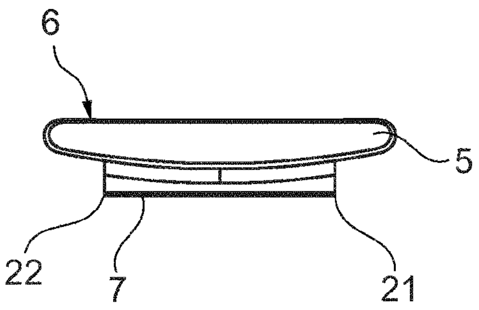
FIGS. 11-15 schematically show the combination part in various views.
Figure 12:
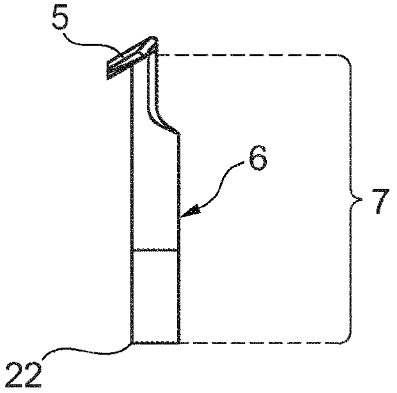
Figure 13:
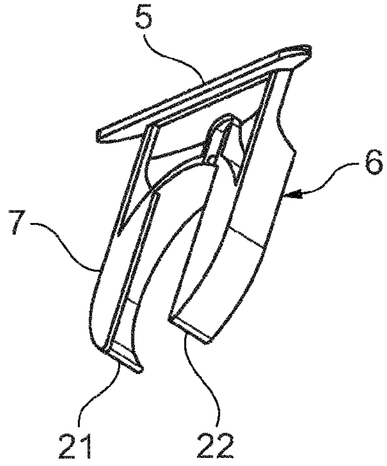
Figure 14:
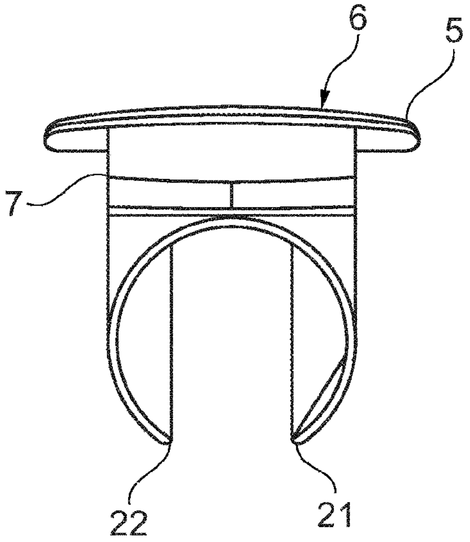
Figure 15:
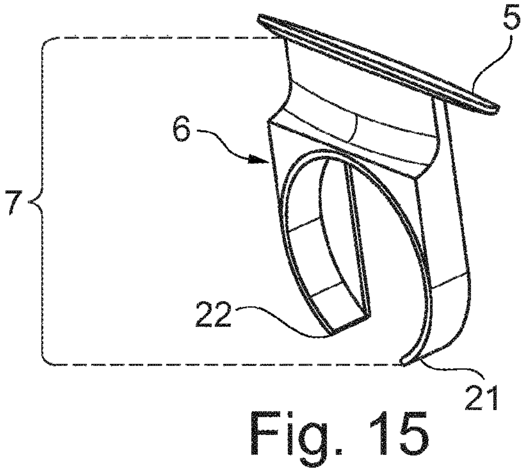
Figure 16:
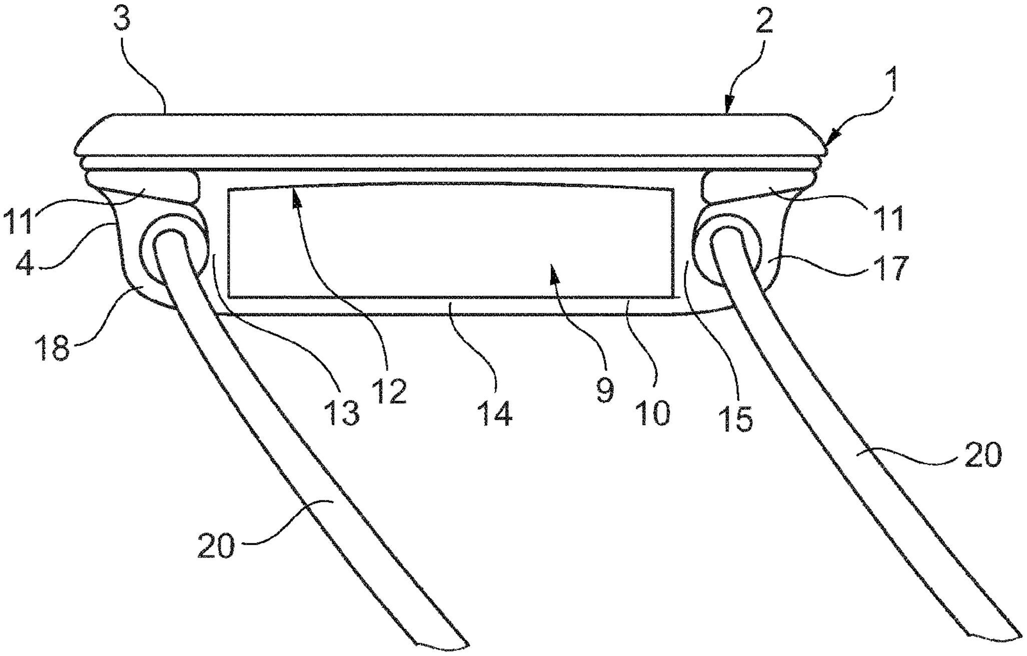
FIG. 16 schematically shows a housing shaft of the label, which is open at the top.

The rear wall 4 additionally comprises a tie guide 16, which is composed of two tubes 17 and 18 running on the left and right edge of the protrusion 10 and a semi-circular depression 19 in the protrusion 10, which connects the tubes 17, 18 and is open to the outside. The top-orientated ends of the tubes 17, 18 end to the left and right side of the recess 12. The tie guide 16 is used to fasten the label 1 to another object (not illustrated) with the aid of a tie 20 inserted into the tie guide (see FIGS. 9, 10 and 16). It can therefore e.g. be tied directly to merchandise or connected (e.g. in a non-detachable manner without additional auxiliary means or tools) to an anti-theft device (not illustrated), wherein the anti-theft device is then connected directly to the merchandise, wherein the anti-theft device is usually only removed by the cashier of a shop. The tie 20 can, as illustrated in FIGS. 9, 10 and 16, have two loose ends or be realized as a closed tie loop.

Furthermore, the positioning of the protrusion 10 in the half of the housing 2, which is orientated towards the side wall 5, brings with it the advantage that, due to the action of gravity, the label 1 hanging on the tie 20 is always aligned such that the side wall 5 always points upwards. The centre of gravity of the label 1 therefore lies offset asymmetrically towards the side wall 5. This circumstance can advantageously be taken into account for image composition, ultimately the orientation of the image content, which means that the image content is always displayed in a correctly orientated manner on the screen 3A for the observer of the label 1.

The details of FIGS. 11-15 are covered in the following, which as mentioned show the combination part 6, which can be inserted into the shaft 9. It is to be highlighted here that the energy storage device holder 7 comprises a left and a right holder element 21 and 22. This entails two advantages.

On the one hand, the insertion and removal of the combination part 6 is facilitated as a result. Namely, contact elements (not visible in the previously described figures, but see FIG. 17, contact tabs 23 and 24) are located in the housing 2 for electrically conductively contacting the poles of the button cell battery 8 and these contact elements can be positioned in the housing 2 in such a manner that they lie between the holder elements 21, 22, that is to say do not come into mechanical interaction with the combination part 6 at all during the insertion or pulling out of the combination part 6, but rather are only in contact with the button cell battery 8.

On the other hand, the two-part design of the holder elements 21 and 22 can also be used to dimension their spacing in such a manner that when a button cell battery 8 is inserted, a clamping action comes about, which substantially prevents an inadvertent falling out of the button cell battery 8 from the energy storage device holder 7.

Figure 17:
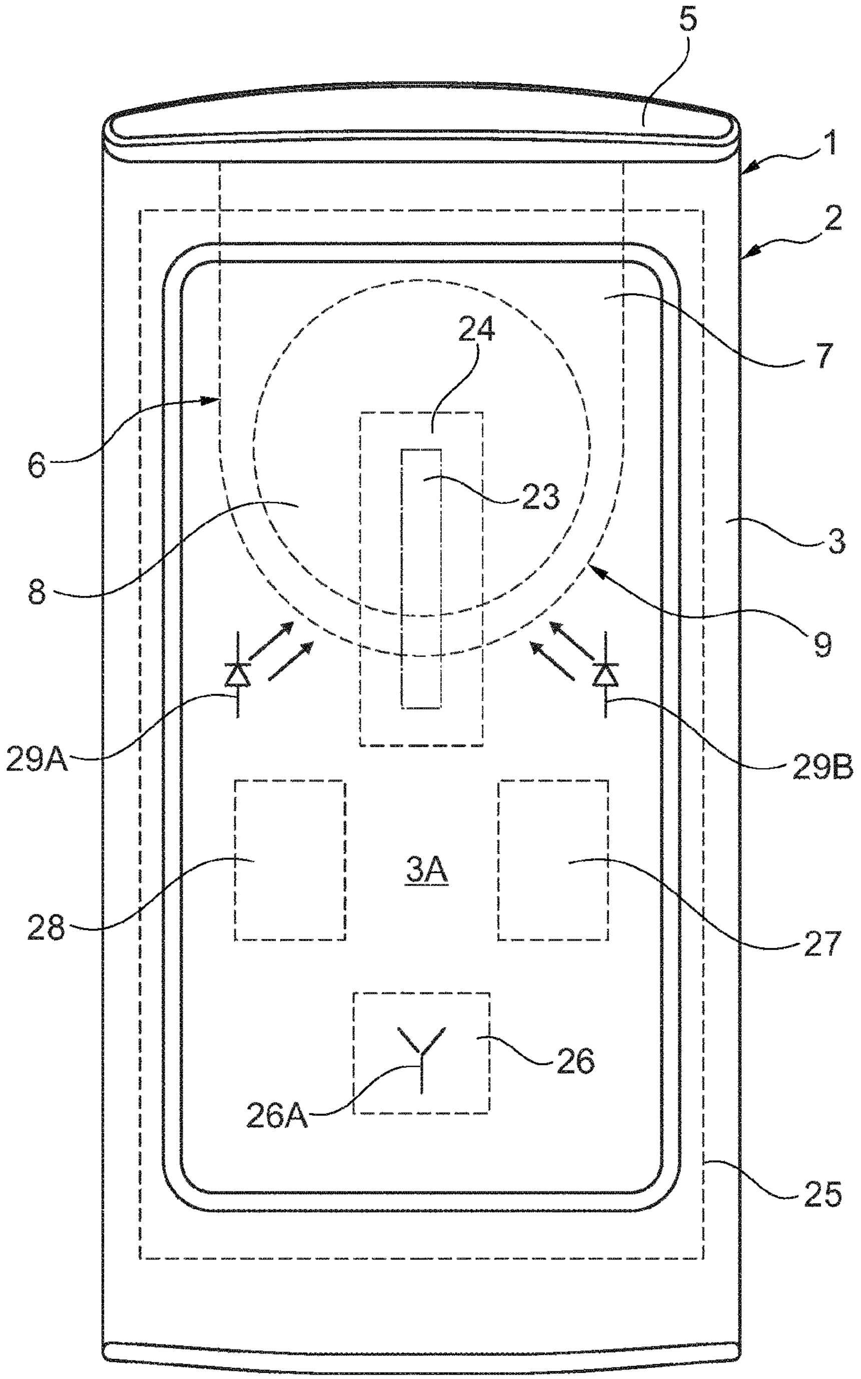
FIG. 17 schematically shows an arrangement of electronic components of the label.

FIG. 17 is covered in the following, which very roughly and not definitively visualizes a selection of electronic functional blocks of the electronics 25 in the interior of the housing 2, without covering details, such as the connections between them, because these will be deduced for the person skilled in the art as a matter of routine. Thus, FIG. 17 shows how the energy storage device holder 7 positions the button cell battery 8 in the interior of the housing 2 between contact tabs 23 and 24 that form contacting elements and these contact tabs 23, 24 respectively contact a pole of the button cell battery 8, e.g. from above and from below, wherein the button cell battery 8 is positioned between the contact tabs 23 and 24. The other ends of the metallic contact tabs 23, 24 are connected to the electronics 25 of the label 1. These electronics 25 include a communication module 26, which is designed for wireless communication with an access point (not illustrated) according to the proprietary time slot communication method mentioned in the general part of the description, and for this, in addition to other electronic components such as a matching network, LC circuit, etc., comprises an antenna configuration 26A, a screen controller 27, which is designed for controlling the screen 3A, and a general digital controller 28, which handles the information exchange with the access point and supplies the screen controller 27 with commands and/or data and also controls the light emission behaviour of two light-emitting diodes 29A and 29B forming the light source. The two light-emitting diodes 29A and 29B are positioned in such a manner that they feed their emitted light into the transparent body of the energy storage device holder 7 at different points of the energy storage device holder 7. In the present case, the feeding-in takes place symmetrically to the position of the button cell battery 8, that is to say to the left and right side thereof, for example at the position or in the region of the position of the button cell battery 8. From there, the light propagates in the body of the energy storage device holder 7 towards the side wall 5 and ensures a uniform, substantially homogeneous illumination of the side wall 5. The two light-emitting diodes 29A and 29B may be monochromatic or designed as RGB LEDs. The feeding in of the light can however also take place above the position of the button cell battery 8 at a distance from the side wall 5 into the energy storage device holder 7. Also, only a single LED may be used in this case. 6

The manner (e.g. colour, flashing frequency, brightness, signal coding, etc.) in which the side wall 5 illuminates, can be controlled from a server (not illustrated) by means of transmitting commands via the access point to the general digital controller 28 of the label 1. The general controller 28 decodes the commands and actuates the light-emitting diodes 29A and 29B accordingly. Thus, very different effects can be achieved for the observer. Thus, the attention of customers and of personnel can be diverted to the relevant label 1. In particular, using the extensive light output via the entire side wall 5, a perception, which is pleasant for the observer, of the optical attention trigger can be achieved, that is to say in a manner quite different than would be the case if a light-emitting diode or another punctiform light source were to flash at them directly, which is often experienced as dazzling and invasive.

In addition, the light output via the forward-inclined side wall 5 brings the advantage with it that in spite of the light signature which is perceived as coming extensively from the front, the front wall 3 is to the greatest extent available for the screen 3A, that is to say with respect to the size and the positioning of the screen 3A, no cutbacks need to be made due to the additional light signal output means (light source, energy storage device holder 7, side wall 5).

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article “a” or “an” does not mean that the relevant features cannot also be present multiple times.

The invention claimed is:

1. An electronic label with a housing, which has a front wall and a rear wall and at least one side wall, wherein the front wall has a screen, wherein by contrast to the front wall and the rear wall, the side wall is constructed to be light-conducting, wherein a light source configured to emit light through the side wall is positioned inside the housing, wherein the side wall has an energy storage device holder protruding into the interior of the housing, which is designed to hold at least one electrical energy storage device at an intended position in the housing, and wherein the rear wall has a protrusion, which surrounds an energy storage device accommodating region, which is dimensioned in such a manner that the energy storage device holder together with the energy storage device can be accommodated therein.

2. The electronic label according to claim 1, wherein the protrusion is lifted from the remainder of the rear wall and is open towards the side wall.

3. The electronic label according to claim 1, wherein in comparison to the protrusion, other regions of the housing are thinner or flatter.

4. The electronic label according to claim 1, wherein the housing has a shaft running between the front wall and the rear wall for accommodating the energy storage device holder.

5. The electronic label according to claim 1, wherein the side wall with its energy storage device holder is designed to be drawer-like.

6. The electronic label according to claim 1, wherein the side wall and the energy storage device holder are constructed in one piece and are transparent.

7. The electronic label according to claim 1, wherein the energy storage device is a battery or a rechargeable battery or a button cell battery.

8. The electronic label according to claim 1, wherein the side wall has a side wall edge with a thickness different from a thickness of a surface of the side wall.

9. The electronic label according to claim 8, wherein the side wall edge is relatively narrow compared to the surface of the side wall.

10. The electronic label according to claim 8, wherein the side wall is placed onto adjacent walls, so that the side wall edge is visible.

11. The electronic label according to claim 1, wherein the side wall is inclined towards the front wall.

12. The electronic label according to claim 1, which comprises battery-operable electronics for actuating the light source.

13. The electronic label according to claim 12, wherein the electronics are designed to control whether and how light is output through the side wall.

14. The electronic label according to claim 13, wherein the electronics are designed to control a frequency, color, and/or intensity of the light output through the side wall.

15. The electronic label according to claim 12, which has at least two LEDs positioned at different places as the light source, with the aid of which light can be fed from various sides into the energy storage device holder.

16. The electronic label according to claim 1, wherein aside from the one light-conducting side wall, the rest of the housing is formed completely by the front wall and the rear wall, which are constructed in a bowl-shaped manner.

17. The electronic label according to claim 1, wherein the rear wall has a recess adjacent to the side wall and a part of the energy storage device holder is exposed in the recess.

18. The electronic label according to claim 17, wherein the protrusion of the rear wall enclosing the energy storage device accommodating region is constructed adjacently to the recess.

19. The electronic label according to claim 1, wherein the screen is reflective.

* * * * *